3,032,474
PRODUCTION OF L-GLUTAMIC ACID
Jackson W. Foster, Austin, Tex., assignor to Merck & Co., Inc., Rahway, N.J., a corporation of New Jersey
No Drawing. Filed Mar. 7, 1958, Ser. No. 719,758
4 Claims. (Cl. 195—47)

This invention relates to the synthesis of L-glutamic acid. More particularly, it relates to the production of L-glutamic by fermentation. Still more particularly, it is concerned with the preparation of L-glutamic acid in the free state, and to the substantial exclusion of D-glutamic acid, by fermentation of a nutrient medium with microorganisms of the genus Bacillus. Still more specifically, it relates to production of L-glutamic acid by fermentation with microorganisms of the Bacillus megaterium-cereus intermediate type.

L-glutamic acid is an amino acid which, in the form of its monosodium salt, is widely used as a flavoring agent for food products. Chemical syntheses of the material are known, but suffer the disadvantage in most instances of giving the racemic form of glutamic acid.

The recovery or isolation of L-glutamic acid from broths is also known. In the vast majority of such cases, however, the immediate fermentand is a complex of glutamic acid, which must be degraded or hydrolyzed to obtain the free acid, or a mixture of the L- and D-forms of the acid. Microbiological syntheses which give glutamate complexes or mixtures of isomers are not satisfactory as commercially preparative methods of L-glutamic acid in view of the added operations required to recover the desired product in pure form. Furthermore, in many of the microbiological syntheses heretofore reported in the literature, only small amounts of L-glutamic acid are formed or are recoverable, thus making such procedures commercially impractical.

It has now been discovered that high yields of free L-glutamic acid can be obtained by fermentation of an appropriate nutrient medium with strains of microorganisms selected from the genus Bacillus, and particularly with strains of the Bacillus megaterium-cereus intermediate type. When the fermentation is carried out under the conditions and with the microorganisms described in detail hereinbelow, L-glutamic acid is formed directly in the fermentation broth substantially free of D-glutamic acid. Only relatively minor amounts of bound glutamic acid are formed.

The microorganisms of the Bacillus megaterium-cereus intermediate type which are useful for producing L-glutamic acid and which are included within the scope of this invention are typified by their growth on glucose-yeast extract-salts nutrient mediums. When grown on such nutrient mediums, the cells appear swollen, distorted in shape and irregular in size. This is an outstanding difference from heretofore known species of Bacillus whose cells form as normal compact rods.

One new L-glutamic acid producing organism falling within the purview of this invention was isolated from soil in Austin, Texas, and maintained on agar slants of a glucose-salts-yeast extract medium and stored at 4° C. In morphological properties it closely resembles Bacillus megaterium and Bacillus cereus but is, as shown below, distinct from either of these species. Therefore, the organism has been designated as a strain of the Bacillus megaterium-cereus intermediates. A culture of this new strain has been deposited in the American Type Culture Collection in Washington, D.C., under the number ATCC 13062.

The morphological characteristics of my new culture ATCC 13062 are as follows:

*Vegetative cells.*—Young cultures from nutrient agar: rods, 0.9–1.2μ x 2.0–5.0μ; single or in short chains; end rounded; stained protoplasm (basic fuchsin) beaded or mottled in appearance; nonmotile; encapsulated; no flagella; Gram negative (6 to 12 hour old culture).

On glucose nutrient agar, the rods were larger, longer and contained many large refractile globules. Old cultures on both media: filaments and chains; long and tangled; cells irregular in shape, some with pointed ends.

On glucose-yeast extract-salts medium, liquid or agar, the young cells were larger and more vacuolated and contained large refractile globules. The morphology in the liquid medium is distinctive, and is quite different from the morphology of the reference strains of Bacillus megaterium and Bacillus cereus. Culture ATCC 13062 in this medium is typically pleomorphic, the majority of cells being distorted in size and misshapen. The cells were considerably swollen, and showed various irregular shapes.

*Sporangia.*—Not distinctly swollen.

*Spores.*—0.8–1.2μ x 1.2–2.2μ; cylindrical or oval; central or paracentral; abundant formation after 48 hours on nutrient agar; resistant to heating for one hour at 60° C.

*Colonies.*—On nutrient agar plate after 48 hours at 30° C.: smooth; circular (1.5–2 mm.); entire; convex; non-spreading; translucent; glistening; creamy white.

*Nutrient agar slants.*—Growth moderate; smooth; soft; glistening; translucent; slightly spreading; moist; creamy white; ammonia odor.

*Nutrient broth.*—Turbid, with sediment; no pellicle.

*Glucose-nutrient agar slants.*—Growth softer and more slimy than on nutrient agar; with pellucid dots.

*Glucose-salts-yeast-extract agar slants.*—Growth abundant; butyrous; raised; moist; glistening; opaque; greyish-white.

*Glucose-salts-yeast-extract broth.*—Turbidity heavy; with sediment and ropy capsular materials; no pellicle.

*Physiological and Biochemical Characters of Bacillus megaterium, Bacillus cereus and Strain ATCC 13062*

| Characters | Bacillus megaterium | Bacillus cereus | Strain ATCC 13062 |
|---|---|---|---|
| Growth on: | | | |
|   Glucose-nitrate agar | + | − | − |
|   Potato | + | + | − |
| Acid formation on: | | | |
|   Glucose | + | + | + |
|   Sucrose | + | ± | − |
|   Mannitol | + | − | − |
|   Arabinos | − | − | − |
|   Xylose | + | − | + |
|   Glycerol | + | + | + |
|   Salicin | − | + | + |
| Voges-Proskauer reaction | − | + | + |
| Hydrolysis of: | | | |
|   Starch | + | + | + |
|   Gelatin | + | + | + |
|   Casein | + | + | + |
| Nitrate reduction | − | + | + |
| Urease formation | + | − | + |
| Citrate utilization [1] | + | + | + |
| Anaerobic growth in glucose broth | − | + | − |
| Anaerobic gas formation from nitrate | − | + | + |
| Egg-yolk reaction | − | + | − |

[1] Citrate agar medium fortified with 0.2% yeast extract.

The nutrient medium employed for the culture of the Bacillus megaterium-cereus intermediate type organisms of this invention to produce L-glutamic acid should contain a source of carbon, a source of nitrogen and salts. Dextrose is the carbohydrate source of choice but other carbohydrates such as starch, sucrose, levulose, lactose, dextrin, molasses and the like may be used satisfactorily if desired. The quantity of L-glutamic acid produced is, at least in part, dependent on the amount of sugar in the medium. For optimum production, I prefer to use a nutrient medium containing a quantity of sugar below the growth limiting concentration, or a medium to which dextrose is added continuously to maintain a level below the growth inhibitive concentration. Whereas concentrations of 10% dextrose or higher may be added to the medium, I prefer to employ a nutrient medium containing from 4 to 8% dextrose.

Examples of suitable nitrogen sources are urea, ammonium salts such as ammonium sulfate, casamino acids and the like. Of these, I prefer to employ urea or ammonium sulfate since good culture growth and high L-glutamic acid production are consistently achieved thereby. It is common also to include certain salts such as potassium phosphate, magnesium, zinc, iron and manganese salts in the medium in minute quantities. These acid trace minerals required by the organism for growth are often found in ample amounts in the carbon and nitrogen sources. I prefer also to include calcium carbonate in the nutrient medium because an improvement in L-glutamic acid yield is usually obtained thereby.

It has been found that the pH of the fermentation medium is critical for high production of L-glutamic acid. The amino acid is formed very satisfactorily in high yield when the pH of the medium is within the range of about 6.5–7.5. As the culture grows and L-glutamic acid is produced the pH of the medium becomes more acidic and if not controlled will eventually become sufficiently acid to retard or inhibit growth of the organism. For this reason, the pH is adjusted to essential neutrality periodically during the fermentation stage by aseptic addition of a base preferably ammonium hydroxide. Re-adjustment of the pH to about 7.0 at intervals of about six hours during the active growth phase of the microorganism has been found adequate for good growth of the culture and high accumulation of L-glutamic acid.

Culturing of this new microorganism is carried out under aerobic conditions. When small scale fermentations are conducted, as in Erlenmeyer flasks, sufficient aeration is achieved by mechanical shaking of the flasks during the fermentation period. For larger scale operations, the nutrient broth is stirred mechanically and sterile air introduced into the medium by techniques well-known in this art. For optimum yields of L-glutamic acid, incubation of the ATCC 13062 strain in the nutrient medium is conducted at about 28–32° C., and preferably at about 30° C., for from 36–84 hours. Very satisfactory yields of L-glutamic acid are obtained after 48–72 hours' incubation under the above conditions.

A particular feature of the invention described hereinabove is the high yield of free L-glutamic acid produced by the new microorganism Bacillus megaterium-cereus intermediate type, such as ATCC 13062. Using the conditions previously discussed, high conversion of carbohydrate to L-glutamic acid is uniformly obtained such conversions have been as high as 60% of the carbohydrate consumed. Concentrations of greater than 25–35 mg. glutamic acid per ml. of fermentation broth have been achieved. In addition to the large amounts of free L-glutamic acid produced, there is also formed a relatively small quantity of bound L-glutamic acid which is readily hydrolyzed to the free acid by treatment with mineral acid, preferably with hydrochloric acid.

The L-glutamic acid produced by cultivation of my new strains of Bacillus on a nutrient medium as described hereinabove may be recovered from the fermentation liquor, after removal of solid matter by filtration or centrifugation, by application of the isolation procedure set forth in J. Biol. Chem., 152, 401 (1944). In general this procedure comprises acidification of a culture filtrate with hydrochloric acid, and sorption of the L-glutamic acid from the acidified liquor on a weakly basic anion exchange resin such as IR–4B, a commercially available resin sold by Rohm & Haas Company. The amino acid is removed from the resin by elution with dilute hydrochloric acid, and concentration of the eluate to a small volume. L-glutamic acid hydrochloride is obtained by crystallization from this latter solution.

The amount of L-glutamic acid in a particular fermentation broth may also be determined without resort to actual isolation of the amino acid by either of two methods, a chemical technique utilizing paper strip chromatography or an enzymatic method described in Arch. Biochem. 11, 155 (1946). These assay methods are set forth in detail below:

A. *Chemical method.*—Culture filtrates containing glutamic acid are spotted on Whatman No. 1 filter paper, guaging the volume applied so as to contain 10 to 90 $\mu$g. glutamic acid. A standard glutamic acid solution is spotted on the same sheet of paper at levels of 10, 30, 50, 70 and 90 $\mu$g. to enable constitution of a calibration curve. Unknowns and standard glutamic acid solutions are run in duplicates on different sheets of paper. The papers are allowed to develop for 20 to 24 hours by the descending method. Phenol saturated with an aqueous solution containing 6.3% sodium citrate and 3.7% monobasic sodium phosphate is used as the developing solvent. It is found to give a good separation of glutamic acid spots from other ninhydrin reacting spots present in the filtrates.

Following overnight drying in a current of air, the chromatograms are sprayed lightly with a solution of 0.1% ninhydrin in water-saturated n-butanol. The glutamic acid spots are localized at Rf values of about 0.23 after heating the papers at 80–100° C. for about two minutes.

Quantitation of the glutamate in the spots is performed by the method of Smith and Agiza, Analyst, 76, 623 (1951). Each glutamic acid spot is then cut into small pieces and placed in 1 ml. of water in a graduated test tube. Two ml. of citrate buffer solution (pH 5) and 2 ml. of ninhydrin reagent are added in sequence to each tube. The tubes are placed in boiling water and 1 ml. of freshly prepared 0.2% $SnCl_2$ solution (in citrate buffer of pH 5) is added to each tube. After heating for 15 minutes, the tubes were removed and cooled in the dark for 10 minutes. The liquid in each tube is made up to 10 ml. by addition of a saturated NaCl solution. The color containing complex is then extracted from the aqueous phase by shaking with 5 ml. of n-butanol. The clear butanol solution is pipetted into a Klett tube and the intensity of the purple color is measured by a Klett-Summerson photoelectrocolorimeter, using a green filter. After correction for the reading of a blank prepared from the chromatogram but containing no glutamic acid, a straight line relationship is found to exist between color intensity and concentration of glutamic acid over a range of 10 to 90 $\mu$g. The glutamic acid content of the unknown filtrates is calculated from their respective standard calibration curves.

B. *Enzymatic method.*—The procedure used is essentially that of Schales and Schales, Arch. Biochem., 11, 155 (1946). A specific L(+)-glutamic decarboxylase is obtained from fresh white squash. The crude enzyme is prepared by blending 90 grams of squash with 30 ml. of ice cold M/15 phosphate buffer (pH 5.75) for about 3 minutes in a Waring Blendor. The material is placed in the refrigerator for one hour and then filtered through cheese cloth. A slightly turbid supernate is obtained after centrifugating the filtrate in the cold. The frozen crude enzyme preparation retained its activity only for two to three days.

The $CO_2$ produced from the decarboxylation of glutamic acid is measured manometrically in Warburg respirometers at 37° C. The main chamber of the Warburg vessel contained 2 ml. of enzyme preparation. One side arm contained 0.2 ml. of a sample representing 0.5–1.0 mg. of glutamic acid, and the other side arm contained 0.2 ml. of 1.2 N sulfuric acid. An enzyme blank is set up by substituting 0.2 ml. of water for unknown sample. The efficiency of the enzyme preparation is checked by substituting 0.2 ml. of a neutralized 0.50%

L(+)-glutamate solution for the sample to be analyzed. Culture filtrates are acidified with 6 N hydrochloric acid to eliminate the $CO_2$ and then neutralized with 28% ammonium hydroxide. The experiments are carried out in an air atmosphere.

After temperature equilibration, the glutamate solutions are tipped into the enzyme. The reaction is allowed to proceed until no more $CO_2$ is liberated, usually 60 minutes. Readings are then taken and the sulfuric acid is tipped into the main vessel to release $CO_2$ (bound) in solution. A control treatment enables determination of the amount of $CO_2$ (bound) in solution at the beginning of the experiment. This value is deducted from the final $CO_2$ determination.

The following examples are given for purposes of illustration and not by way of limitation:

EXAMPLE 1

A series of fermentations was carried out in 500 ml. sterilized cotton-plugged Erlenmeyer flasks, using a sterile nutrient medium of the following composition:

| | Grams/liter |
|---|---|
| Dextrose | 30.00 |
| $(NH_4)_2SO_4$ | 2.64 |
| $KH_2PO_4$ | 2.38 |
| $K_2HPO_4$ | 5.65 |
| $MgSO_4 \cdot 7H_2O$ | 1.00 |
| $FeSO_4 \cdot 7H_2O$ | 0.0011 |
| $MnCl_2 \cdot 4H_2O$ | 0.0079 |
| $ZnSO_4 \cdot 7H_2O$ | 0.0015 |
| Yeast extract (Difco) | 0.25 |
| $CaCO_3$ | 0.10 |

The dextrose and $CaCO_3$ were sterilized separately. The pH was adjusted, as necessary to 6.9.

100 ml. of the above medium was inoculated with 2% by volume of a vegetative inoculum of the culture *Bacillus megaterium-cereus* ATCC 13062 and the fermentation carried out on a rotary mechanical shaker at approximately 30° C. for 72 hours. The fermentation broths were periodically adjusted to pH 6.5–7.5, as judged by the color of brom thymol blue indicator, by addition of concentrated ammonium hydroxide.

At the completion of the fermentation the bacterial cells and residual $CaCO_3$ were removed by centrifugation and the amount of L-glutamic acid in the clear centrifugate determined by the enzymatic assay method described hereinabove. The following results were obtained:

| Filtrate No.: | Free L-glutamic acid (mg./ml.) |
|---|---|
| 1 | 5.42 |
| 2 | 5.74 |
| 3 | 5.86 |
| 4 | 5.05 |

EXAMPLE 2

A series of fermentations was conducted following the procedure of Example 1 to determine the L-glutamic acid yields with different carbon sources in nutrient medium. The nutrient medium was the same as medium A of Example 1, except that the dextrose of medium A was replaced by the carbon source indicated in the table of results below. The L-glutamic acid yields were determined by the chemical assay procedure previously described.

| Carbon source: | Free L-glutamic acid (mg./ml.) |
|---|---|
| Glucose | 5.80 |
| Sucrose | 5.04 |
| Lactose | 5.20 |
| Starch | 5.05 |

EXAMPLE 3

Fermentations were carried out in 250 ml. Erlenmeyer flasks using a sterile nutrient medium of the same composition as that of Example 1 except that sucrose was used in place of dextrose and the yeast extract concentration was 0.1 gram per liter. The concentrations of sucrose and $CaCO_3$ were varied as shown in the table of results below. These two ingredients were sterilized separately and added to the other sterile nutrients.

The culture used and the method of carrying out the fermentation were the same as described in Example 1.

Fermentation samples were assayed by a bio-assay and an electrophoresis assay procedure.

The bio-assay is a cylinder-cup procedure using *Lactobacillus arabinosus* as assay organism. The assay is carried out in an amino acid-vitamin mixture-agar medium which supports growth of the test culture only when L-glutamic acid or glutamine are added. After a suitable incubation period the zones of exhibition around the cups are measured and compared with those of an L-glutamic acid standard.

A paper strip electrophoresis assay was run in order to separate L-glutamic acid from other components of the fermentation broth, including glutamine. By using a direct current potential and a suitable electrolyte, L-glutamic acid migrated toward the positive (+) anode. Development of the paper strip after electrophoresis with the usual ninhydrin reagent under controlled conditions gave pigmented zones whose densities, read directly on a photovolt densitometer, were proportional to the amount of L-glutamic acid present.

*Experiment A* [1]

| Sucrose | $CaCO_3$ | L-Glutamic Acid Produced | |
|---|---|---|---|
| | | Bio-Assay | Electrophoresis Assay |
| (a) 45 | 0.1 | 13.7 | 11.6 |
| (b) 45 | 1.0 | 14.6 | 12.0 |
| (c) 45 | 5.0 | 16.5 | 16.1 |
| (d) 45 | 10.0 | 19.1 | 18.7 |

*Experiment B* [1]

| Sucrose | $CaCO_3$ | L-Glutamic Acid Produced | |
|---|---|---|---|
| | | Bio-Assay | Electrophoresis Assay |
| (a) 60 | 1.0 | 21.9 | 16.2 |
| (b) 60 | 10.0 | 24.3 | 19.4 |
| (c) 60 | 20.0 | 30.3 | 30.4 |

[1] All figures in terms of grams per liter of fermentation liquor.

EXAMPLE 4

Fermentations were carried out in 5-liter fermentors using the same medium as described in Example 1 except that 45 grams per liter of sucrose was used in place of dextrose, 0.1 gram per liter of yeast extract in place of 0.25 gram per liter and 1.0 gram per liter of $CaCO_3$ in place of 0.1 gram per liter. In experiment 2, additional sucrose was charged during the fermentation as indicated below.

The fermentations were carried out as follows:

| | |
|---|---|
| Culture | *Bacillus megaterium-cereus* ATCC 13062. |
| Volume | 3200 ml. |
| Agitation | Two 3-inch turbine impellers running at 561 r.p.m. |
| Aeration | 3 liters per minute. |
| pH Adjustment | Concentrated ammonia water was added every 6 hours to maintain a pH of 6.5 to 7.2. |
| Temperature | 28° C. |
| Antifoam | GE-66 silicone antifoam was added as needed. |
| Assay | Cylinder-plate bio-assay. |

Results:

*Experiment 1*

| Age, Hours | Sucrose Mg./Ml. | Glutamic Acid Assay, Mg./Ml. |
| --- | --- | --- |
| 0 | 49.5 | 0 |
| 24 | 46.5 | 0 |
| 48 | 55.2 | 0 |
| 72 | 43.6 | 5.9 |
| 96 | 23.2 | 10.0 |
| 120 | 10.8 | 12.4 |

*Experiment 2*

| Age, Hours | Sucrose Mg./Ml. | Glutamic Acid[1] Assay, Mg./Ml. |
| --- | --- | --- |
| 0 | 37.5 | 0 |
| 24 | 43.5 | 0 |
| 48 | 43.2 | 0 |
| 72 | 36.0 | 3.8 |
| 96 | 43.6 | 8.3 |
| 120 | 53.6 | 14.0 |

[1] At 60 hours fermentation time, sucrose feed was started at the rate of 0.08% per hour and continued until the end of the fermentation.

The vegetative inoculum of the culture ATCC 13062 employed in the above examples was developed using a nutrient medium similar to the medium described in Example 1 with the exception that the 30 grams per liter of dextrose in the medium of Example 1 is replaced by 10 grams per liter of dextrose. The inoculum cultures were allowed to grow on this medium for 18–24 hours with continuous shaking at about 30° C.

EXAMPLE 5

L-glutamic acid produced by fermentation according to the present invention was isolated from the fermentation broth by the following procedure:

50 ml. of culture filtrate was concentrated to a small volume in vacuo and acidified with 20 ml. of 6 N hydrochloric acid. This solution was neutralized by stirring for one to three hours with about 100 grams of wet Amberlite IR4B ion exchange resin until the pH of the solution was 6–7. (The ion exchange resin was prepared by washing successively with liberal amounts of 4% hydrochloric acid, water, 4% sodium carbonate and water. At the completion of this washing the resin was in the basic form.) The solution was decanted from the resin and the resin water-washed repeatedly and the washings decanted. The combined solutions and washings were filtered and concentrated in vacuo to a volume of about 50 ml. This solution was again acidified with 20 ml. of 6 N hydrochloric acid and neutralized with 100 grams of fresh resin. This cycle was repeated once more.

The three batches of resin having the L-glutamic acid sorbed thereon were extracted by stirring with 0.25 N hydrochloric acid until the pH of the extract fell below 2. The extracts containing the L-glutamic acid were combined and concentrated to a syrup in vacuo. Several milliliters of concentrated hydrochloric acid were added to this syrup. Crystals of L-glutamic acid hydrochloric form upon allowing this acidified solution to stand in the cold for 24 hours. The crystals were recovered by filtration and washed separately with ethanol and ether.

Any departure from the above description which conforms to the present invention is intended to be included within the scope of the claims.

What is claimed is:

1. The process of making L-glutamic acid that comprises cultivating *Bacillus megaterium-cereus* intermediate type species ATCC 13062 in an aqueous nutrient medium containing a source of carbon and nitrogen under aerobic conditions at a pH of about 6.5 to about 7.5.

2. The process of claim 1 wherein the nitrogen source is ammonium hydroxide.

3. The process of claim 1 wherein the nitrogen source is urea.

4. The process of making L-glutamic acid that comprises cultivating *Bacillus megaterium-cereus* intermediate type species ATCC 13062 in an aqueous nutrient medium containing a source of carbon and nitrogen under aerobic conditions at a pH of about 6.5 to about 7.5, and recovering the L-glutamic acid thus produced.

References Cited in the file of this patent

UNITED STATES PATENTS 2,798,839    Huang et al. _____ July 9, 1957

OTHER REFERENCES

Journal of Biological Chemistry, vol. 187, pages 439 to 451 and 821 to 830 (1950).

Proc. of the Int. Symposium of Enzyme Chemistry, Tokyo, Kyoto, 1957, pages 464 to 468, published 1958, Maruzen, Tokyo. QP60115.

Chemical Abstracts, vol. 51, 7643–7644.